(12) United States Patent
Phaneuf et al.

(10) Patent No.: US 9,064,163 B2
(45) Date of Patent: Jun. 23, 2015

(54) RFID ENABLED CRATE WITH WRAPAROUND ANTENNA

(75) Inventors: Peter C. Phaneuf, Sparta, MI (US); Michael J. Isabell, Grand Rapids, MI (US)

(73) Assignee: Avery Dennison Corporation, Glendale, CA (US)

( * ) Notice: Subject to any disclaimer, the term of this patent is extended or adjusted under 35 U.S.C. 154(b) by 389 days.

(21) Appl. No.: 12/868,662

(22) Filed: Aug. 25, 2010

(65) Prior Publication Data

US 2011/0121972 A1    May 26, 2011

Related U.S. Application Data

(60) Provisional application No. 61/238,242, filed on Aug. 31, 2009.

(51) Int. Cl.
*G08B 13/14* (2006.01)
*G06K 7/10* (2006.01)
*G06K 17/00* (2006.01)

(52) U.S. Cl.
CPC ........ *G06K 7/10178* (2013.01); *G06K 17/0029* (2013.01)

(58) Field of Classification Search
CPC .................. G06K 19/07749; G06K 19/07718; G06K 19/07722; H01Q 1/2225; B65D 11/1833
USPC .................................. 340/572.6, 572.8, 572.9
See application file for complete search history.

(56) References Cited

U.S. PATENT DOCUMENTS

| | | | | |
|---|---|---|---|---|
| 6,121,880 A | * | 9/2000 | Scott et al. | 340/572.5 |
| 7,048,134 B1 | * | 5/2006 | Hagan | 220/6 |
| 7,048,135 B2 | * | 5/2006 | Smyers et al. | 220/6 |
| 7,605,708 B2 | * | 10/2009 | Cote et al. | 340/572.8 |
| 2003/0090388 A1 | * | 5/2003 | Pomes | 340/825.49 |
| 2004/0226944 A1 | * | 11/2004 | Lee | 220/4.28 |
| 2007/0152830 A1 | * | 7/2007 | Burr | 340/572.7 |

* cited by examiner

*Primary Examiner* — Brian Zimmerman
*Assistant Examiner* — Bhavin M Patel
(74) *Attorney, Agent, or Firm* — Avery Dennison Retail Information Services LLC (57) ABSTRACT

A radio frequency identification (RFID) enabled crate (50) includes: a plurality of sides (52); an RFID inlay (54) supported on a first one of the plurality of sides; and an antenna (56) coupled to the RFID inlay (54). Suitably, the antenna (56) extends at least partially across at least a second one of the plurality of sides (52), the second one of the sides being different from the first one where the RFID inlay (54) is located.

16 Claims, 5 Drawing Sheets

RFID ENABLED CRATE WITH WRAPAROUND ANTENNA

CROSS-REFERENCE TO RELATED APPLICATION

The present application claims priority from U.S. Provisional Application No. 61/238,242 filed Aug. 31, 2009, which is incorporated herein by reference in its entirety.

BACKGROUND OF THE INVENTION

The present inventive subject matter relates generally to the art of radio frequency (RF) communications and/or other like wireless or over-the-air (OTA) telecommunications. Particular relevance is found in connection with crates or other containers or the like that bear RFID (RF IDentification) devices or other similar telecommunication devices, and accordingly the present specification makes specific reference thereto. However, it is to be appreciated that aspects of the present inventive subject matter are also equally amenable to other like applications.

RFID devices are generally known in the art. Conventionally, RFID receivers, transmitters and/or transponders (collectively referred to herein as RFID "devices") are widely used to associate a tagged or labeled object with an identification code and/or other information provided by the RFID device. RFID devices are conventionally used, e.g., to track inventory, parcels and/or other objects.

A typical RFID device generally includes a number of components including an antenna for wirelessly transmitting and/or receiving RF signals and analog and/or digital electronics operatively connected thereto. So called active or semi-passive RFID devices may also include a battery, capacitor, super capacitor or other suitable power source. In conventional parlance, the RFID electronics along with any operatively connected antenna and/or power source are collectively referred to as the RFID inlay. Exemplary RFID inlays are available from Avery Dennison RFID Company of Clinton, S.C. Commonly, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions. In general, RFID devices can typical retain and communicate enough information to uniquely identify individuals, packages, inventory and/or other like objects, e.g., to which the RFID device is affixed.

Commonly, an RFID reader or base station is used to wirelessly obtain data or information (e.g., such as the aforementioned identification code) communicated from an RFID device. The manner in which the RFID reader interacts and/or communicates with the RFID device generally depends on the type of RFID device. A given RFID device is typically categorized as a passive device, an active device, a semi-passive device (also known as a battery-assisted or semi-active device) or a beacon type RFID device (which can be thought of as a sub-category of active devices). Passive RFID devices generally use no internal power source, and as such, they are passive devices which are only active when an RFID reader is nearby to power the RFID device, e.g., via wireless illumination of the RFID device with an RF signal and/or electromagnetic energy from the RFID reader. Conversely, semi-passive and active RFID devices are provided with their own power source (e.g., such as a small battery). To communicate, conventional RFID devices (other than so called beacon types) respond to queries or interrogations received from RFID readers. The response is typically achieved by backscattering, load modulation and/or other like techniques that are used to manipulate the RFID reader's field. Commonly, backscatter is used in far-field applications (i.e., where the distance between the RFID device and reader is greater than approximately a few wavelengths), and alternately, load modulation is used in near-field applications (i.e., where the distance between the RFID device and reader is within approximately a few wavelengths).

Passive RFID devices typically signal or communicate their respective data or information by backscattering a carrier wave from an RFID reader. That is to say, in the case of conventional passive RFID devices, in order to retrieve information therefrom, the RFID reader typically sends an excitation signal to the RFID device. The excitation signal energizes the RFID device which transmits the information stored therein back to the RFID reader. In turn, the RFID reader receives and decodes the information from the RFID device.

As mentioned earlier, passive RFID devices commonly have no internal power supply. Rather, power for operation of a passive RFID device is provided by the energy in the incoming RF signal received by the RFID device from the RFID reader. Generally, a small electrical current induced in the antenna of the RFID device by the incoming RF signal provides just enough power for the IC or microchip in the RFID device to power up and transmit a response. This means that the antenna generally has to be designed both to collect power from the incoming signal and also to transmit the outbound backscatter signal.

Passive RFID devices have the advantage of simplicity and long life (e.g., having no battery to go dead). Nevertheless, their performance may be limited. For example, passive RFID devices generally have a more limited range as compared to active RFID devices.

Active RFID devices, as opposed to passive ones, are generally provisioned with their own transmitter and a power source (e.g., a battery, photovoltaic cell, etc.). In essence, an active RFID device employs the self-powered transmitter to broadcast a signal which communicates the information stored on the IC or microchip in the RFID device. Commonly, an active RFID device will also use the power source to power the IC or microchip employed therein.

Broadly speaking, there are two kinds of active RFID devices—one that can be generally thought of as a transponder type of active RFID device and the other as a beacon type of active RFID device. A significant difference is that active transponder type RFID devices are only woken up when they receive a signal from an RFID reader. The transponder type RFID device, in response to the inquiry signal from the RFID reader, then broadcasts its information to the reader. As can be appreciated, this type of active RFID device conserves battery life by having the device broadcast its signal only when it is within range of a reader. Conversely, beacon type RFID devices transmit their identification code and/or other data or information autonomously (e.g., at defined intervals or periodically or otherwise) and do not respond to a specific interrogation from a reader.

Generally, active RFID devices, due to their on-board power supply, may transmit at higher power levels (e.g., as compared to passive devices), allowing them to be more robust in various operating environments. However, the battery or other on-board power supply can tend to cause active RFID devices to be relatively larger and/or more expensive to manufacture (e.g., as compared to passive devices). Additionally, as compared to passive RFID devices, active RFID devices have a potentially more limited shelf life—i.e., due to the limited lifespan of the battery. Nevertheless, the self supported power supply commonly permits active RFID devices to include generally larger memories as compared to passive devices, and in some instances the on-board power source also allows the active device to include additional functionality, e.g., such as obtaining and/or storing environmental data from a suitable sensor.

Semi-passive RFID devices are similar to active devices in that they are typically provisioned with their own power source, but the battery commonly only powers the IC or microchip and does not provide power for signal broadcasting. Rather, like passive RFID devices, the response from the semi-passive RFID device is usually powered by means of backscattering the RF energy received from the RFID reader, i.e., the energy is reflected back to the reader as with passive devices. In a semi-passive RFID device, the battery also commonly serves as a power source for data storage.

A conventional RFID device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). Typically, passive LF RFID devices (also referred to as LFID or Low Frequency devices) can usually be read from within approximately 12 inches (0.33 meters); passive HF RFID devices (also referred to as HFID or High Frequency devices) can usually be read from up to approximately 3 feet (1 meter); and passive UHF RFID devices (also referred to as Ultra high frequency devices) can be typically read from approximately 10 feet (3.05 meters) or more. One important factor influencing the read range for passive RFID devices is the method used to transmit data from the device to the reader, i.e., the coupling mode between the device and the reader—which can typically be either inductive coupling or radiative/propagation coupling. Passive LFID devices and passive HFID devices commonly use inductive coupling between the device and the reader, whereas passive UHF RFID devices commonly use radiative or propagation coupling between the device and the reader.

In inductive coupling applications (e.g., as are conventionally used by passive LF RFID and HF RFID devices), the device and reader are typically each provisioned with a coil antenna that together form an electromagnetic field therebetween. In inductive coupling applications, the device draws power from the field, uses the power to run the circuitry on the device's IC or microchip and then changes the electric load on the device antenna. Consequently, the reader antenna senses the change or changes in the electromagnetic field and converts these changes into data that is understood by the reader or adjunct computer. Because the coil in the device antenna and the coil in the reader antenna have to form an electromagnetic field therebetween in order to complete the inductive coupling between the device and the reader, the device often has to be fairly close to the reader antenna, which therefore tends to limit the read range of these systems.

Alternately, in radiative or propagation coupling applications (e.g., as are conventionally used by passive UHF RFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHF RFID devices can communicate data in a variety of different ways, e.g., they can increase the amplitude of the reflected wave sent back to the reader (i.e., amplitude shift keying), shift the reflected wave so it's out of phase with respect to the received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factor, e.g., the intended application, the type of device (i.e., active, passive, semi-active, etc.), the desired read range, the device-to-reader coupling mode, the frequency of operation of the device, etc. For example, insomuch as passive LF RFID devices are normally inductively coupled with the reader, and because the voltage induced in the device antenna is proportional to the operating frequency of the device, passive LF RFID devices are typically provisioned with a coil antenna having many turns in order to produce enough voltage to operate the device's IC or microchip. Comparatively, a conventional HF RFID passive device will often be provisioned with an antenna which is a planar spiral (e.g., with 5 to 7 turns over a credit-card-sized form factor), which can usually provide read ranges on the order of tens of centimeters. Commonly, HF RFID antenna coils can be less costly to produce (e.g., compared to LF RFID antenna coils), since they can be made using techniques relatively cheaper than wire winding, e.g., lithography or the like. UHF RFID passive devices are usually radiatively and/or propagationally coupled with the reader antenna and consequently can often employ conventional dipole-like antennas.

Using an RFID device to track and/or identify an object or inventory is not unknown in general. However, limitations of conventional RFID devices can be experienced in some circumstances. In particular, exchanging RF signals between an RFID device and reader can be complicated by certain substances that are generally "RF unfriendly," e.g., such as water or metal. These RF unfriendly materials can block or impede RF signals or act to detune the respective antenna of an RFID device in close proximity to the material.

Figure 1:
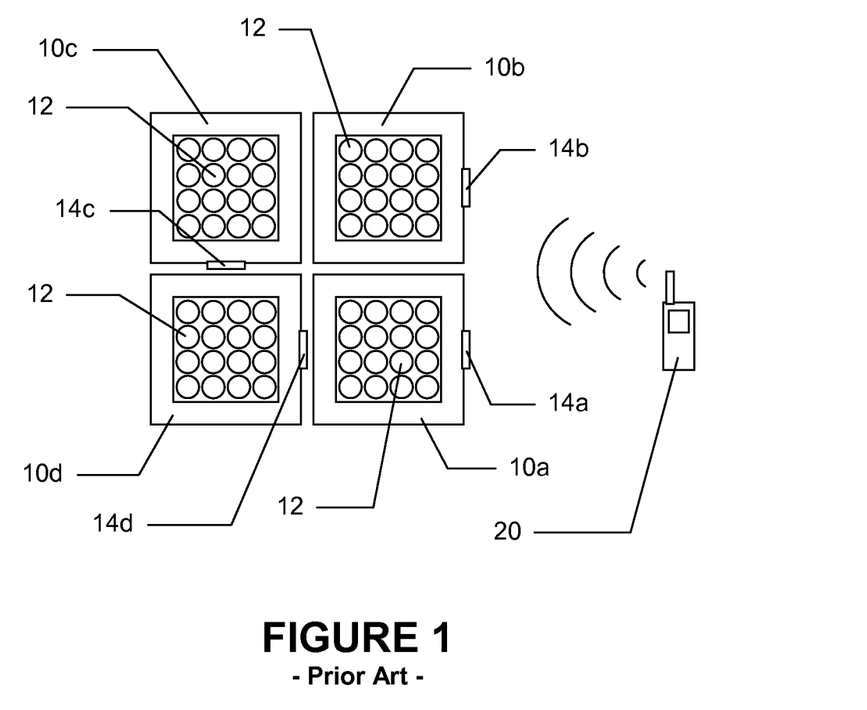
FIG. 1 is a diagrammatic illustration showing a top view of an exemplary stack of conventional crates bearing RFID inlays.

For example, the foregoing phenomena can be especially problematic when a plurality of crates or other containers of RF unfriendly material are stacked together, e.g., on a pallet or otherwise. With reference now to FIG. 1, such an arrangement is shown. More specifically, crates 10a through 10d are shown stacked together in close proximity to one another. For the sake of illustrating the present point, each crate contains an RF unfriendly material, e.g., one or more bottles of water 12. Additionally, each crate is tagged on one side thereof with an RFID device or inlay 14a through 14d. As can be appreciated, when the crates are positioned together next to one another (e.g., such that their relative orientation to one another is random or quasi-random), it is possible that one or more of the RFID inlays (e.g., inlays 14c and 14d in the illustrated example) will be positioned on a wall or side of its respective crate that resides on the interior of the overall stack. Accordingly, an RFID reader (e.g., such as the illustrated reader 20) at the periphery of the overall stack may have trouble communicating with the buried inlays.

Of course, one solution to the forgoing problem is to deliberately stack and/or position the crates such that the RFID inlays always reside on walls or sides of the respective crates that face an exterior perimeter of the overall stack. However, manual execution of this solution can be labor intensive and/or prone to human error. Mechanical and/or automatic implementation of the this solution on the other hand involves additional equipment to detect which side of each crate bears the RFID inlay and then control or adjust each crate's relative orientation accordingly.

Therefore, a new and/or improved approach and/or crate is disclosed which addresses the above-referenced problem(s) and/or others.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, a crate is provided that includes: a first wall and a second wall distinct from the first wall; an RFID inlay arranged on the first wall; and an antenna operatively coupled to the RFID inlay, the antenna extending some length along the second wall.

In another exemplary embodiment of the presently described invention, RFID enable crate, is provided and includes a crate that has a base portion which is surrounded by a series of side walls, at least one of the sidewalls having a conductive element contained within the at least one side wall. A plurality of consumer goods is disposed on the base portion of the crate. A RFID inlay is adhesively attached to the at least one side wall and disposed on the at least one side wall so as to capacitively couple to the conductive element.

In a still further exemplary embodiment of the presently described invention, RFID enabled crate is provided and includes a crate that has a base portion surrounded by a series of side walls, with more than two of the sidewalls having a conductive element contained within the sidewalls. A plurality of consumer goods is disposed on the base portion of the crate. At least one RFID inlay adhesively attached to the at least one side wall having a conductive element and is disposed on the at least one side wall so as to capacitively coupled to the conductive element.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENTS

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

In general, there is disclosed herein an RFID enabled crate or other like container. Suitably, an RFID inlay is supported on and/or encapsulated in a first side or wall of the crate. Suitably, the RFID inlay comprises the customary elements, e.g., including at least an RFID IC or microchip or other like electronics that is operatively connected to an integrated or primary antenna. In one exemplary embodiment, the RFID device is a passive UHF RFID device. To improve communications with the RFID device from multiple sides of the crate, an external or secondary antenna is operatively coupled to the RFID inlay. Suitably, the secondary antenna extends at least some length along a second side or wall of the crate that is different from the first side or wall where the RFID inlay is located. Optionally, the external antenna is an electrically conductive length of wire or other like element that may be supported on and/or attached to an exterior surface of the container walls or alternately it may be encapsulated or otherwise contained in the container walls. Suitably, the secondary antenna extends along at least two walls or sides of the crate. In one exemplary embodiment, the secondary antenna extends along three walls or sides of the crate or all four walls or sides of the crate.

Optionally, the secondary antenna is capacitively (parasitically) or inductively coupled to the RFID inlay, e.g., via the primary antenna. That is to say an end or portion of the secondary antenna can be positioned relative to the RFID inlay and/or the primary antenna so as to be inductively or capacitively coupled therewith. Alternately, the external antenna can be connected to the RFID inlay. For example, the external antenna can be connected to the primary antenna or the primary antenna may be omitted from the inlay and the external antenna connected the RFID IC or microchip or other like electronics. The inlay alternatively can be included in a label that is adhered to the side wall of the crate or inserted into an opening in the crate.

In one suitable embodiment, the crate is collapsible. That is to say, optionally one or more of the sides or walls of the crate may be selectively folded or swung or pivoted at or near an edge or end thereof so as to lie substantially parallel to another side or wall of the crate. Optionally, the crate is made of plastic or another suitable material.

Figure 2:
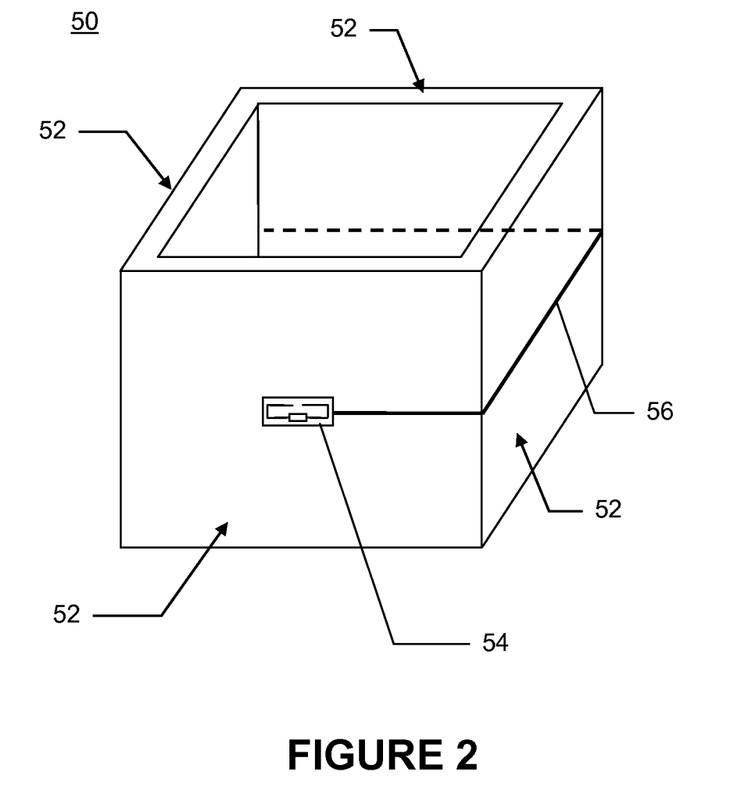
FIG. 2 is a diagrammatic illustration showing a perspective view of an exemplary RFID enabled crate in accordance with aspect of the present inventive subject matter.

With reference now to FIG. 2, there is shown an exemplary RFID enabled crate 50. As shown, the crate 50 includes a plurality of walls or sides 52. More specifically, the crate 50 includes four side walls and a bottom wall in the illustrated embodiment. While the sides or walls 52 of the crate 50 are illustrated herein as solid, in practice they may be solid or perforated or formed from a lattice or otherwise.

In any event, suitably, an RFID inlay 54 or other like device is arranged on or in a first side or wall of the crate 50. Optionally, the inlay 54 is attached to or otherwise supported on a surface of the first side or wall, or alternately, the inlay 54 is embedded or encapsulated in the first side or wall.

In a suitable embodiment, the inlay 54 includes at least an RFID IC or microchip or other suitable electronics and an optional integrated or primary antenna operatively connected or otherwise coupled thereto. The inlay 54 may also include a battery or other suitable power source. In the usual fashion, the RFID IC or microchip or other suitable electronics optionally comprises, e.g., communications electronics, data memory, control logic, etc. In operation, the IC or microchip and/or other electronics function to store and/or process information, modulate and/or demodulate RF and/or other signals, as well as optionally performing other specialized and/or conventional RFID functions. Optionally, the RFID device is a passive UHFID.

In the illustrated embodiment, an external or secondary antenna 56 is operatively coupled to the RFID inlay 54. Suitably, the secondary antenna 56 extends at least some length along a second side or wall of the crate 50 that is different from the first side or wall where the RFID inlay 54 is located. Optionally, the external antenna 56 is an electrically conductive length of wire or other like element that is supported on and/or attached to a surface of the container walls, or alternately, the antenna 56 is embedded, encapsulated or otherwise contained in the container walls. Suitably, the secondary antenna 56 extends along at least two walls or sides of the crate 50. In the illustrated exemplary embodiment, the secondary antenna 56 extends along three walls or sides of the crate 50.

Optionally, the secondary antenna 56 is capacitively or inductively coupled to the RFID inlay 54, e.g., via the primary antenna. That is to say an end or portion of the secondary antenna 56 is positioned relative to the RFID inlay 54 and/or the primary antenna thereof so as to be inductively or capacitively coupled therewith. Alternately, the external antenna 56 is connected to the RFID inlay 54. For example, the external antenna 56 can be connected to the primary antenna or the primary antenna may be omitted from the inlay 54 and the external antenna 56 connected the RFID IC or microchip or other like electronics.

Figure 3:
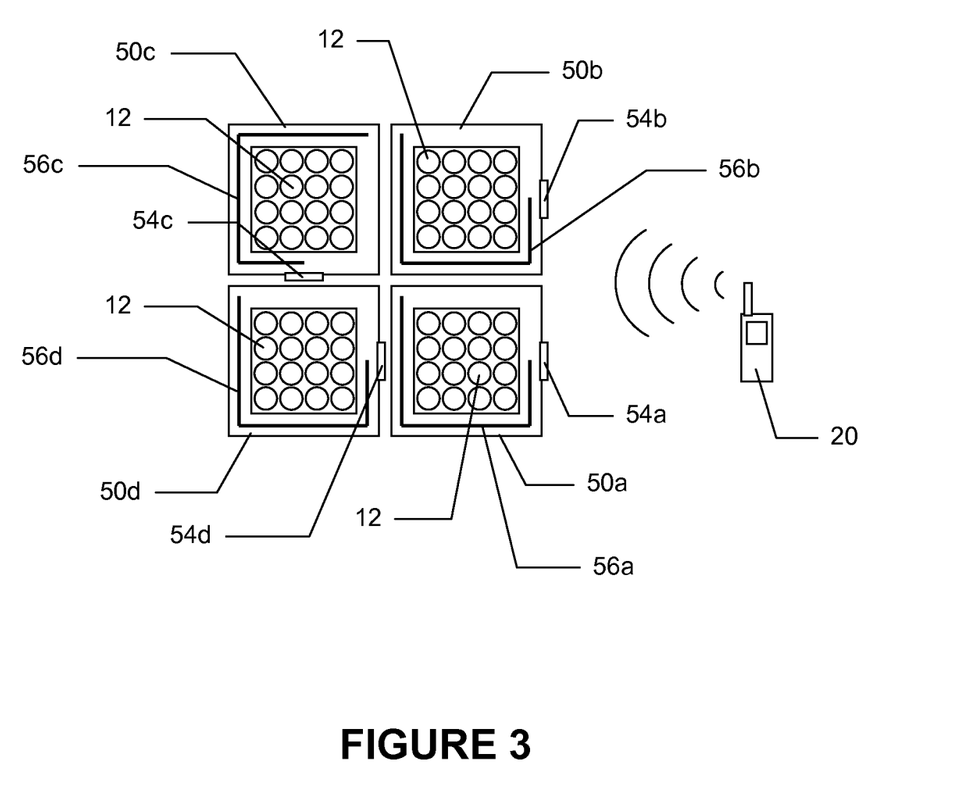
FIG. 3 is a diagrammatic illustration showing a top view of a plurality of the crates from FIG. 2 stacked in close proximity to one another.

With reference now to FIG. 3, there is shown a plurality of crates 50a through 50d or other like containers of RF unfriendly material stacked closely together, e.g., on a pallet or otherwise. For the sake of illustrating the present point, each crate contains an RF unfriendly material, e.g., one or more bottles of water 12, or other material such as cases of consumer goods, e.g. canned foods, pastes and the like. Suitably, each crate 50a-d is arranged, equipped and/or otherwise provisioned in a fashion similar to crate 50 illustrated in FIG. 2. That is to say, each crate 50a-d is tagged on at least one side or wall thereof with an RFID device or inlay 54a through 54d (e.g., which are arranged like and/or substantially similar to the inlay 54), and each crate 50a-d is provisioned with a suitable secondary or external antenna 56a through 56d (e.g., which are arranged like and/or substantially similar to the antenna 56). As can be appreciated from the present example, even when the crates are positioned together next to one another such that their relative orientation to one another is random or quasi-random, all the crates 50a-d have at least one side or wall which faces an exterior the overall stack and which incorporates at least a portion of their respective secondary antennas 56a-d. Accordingly, an RFID reader (e.g., such as the illustrated reader 20) located at and/or moved around a periphery of the overall stack can maintain communication with all the inlays 54a-d (e.g., via the secondary antennas 56a-d), even if a given inlay is buried within an interior of the overall stack.

Figure 4:
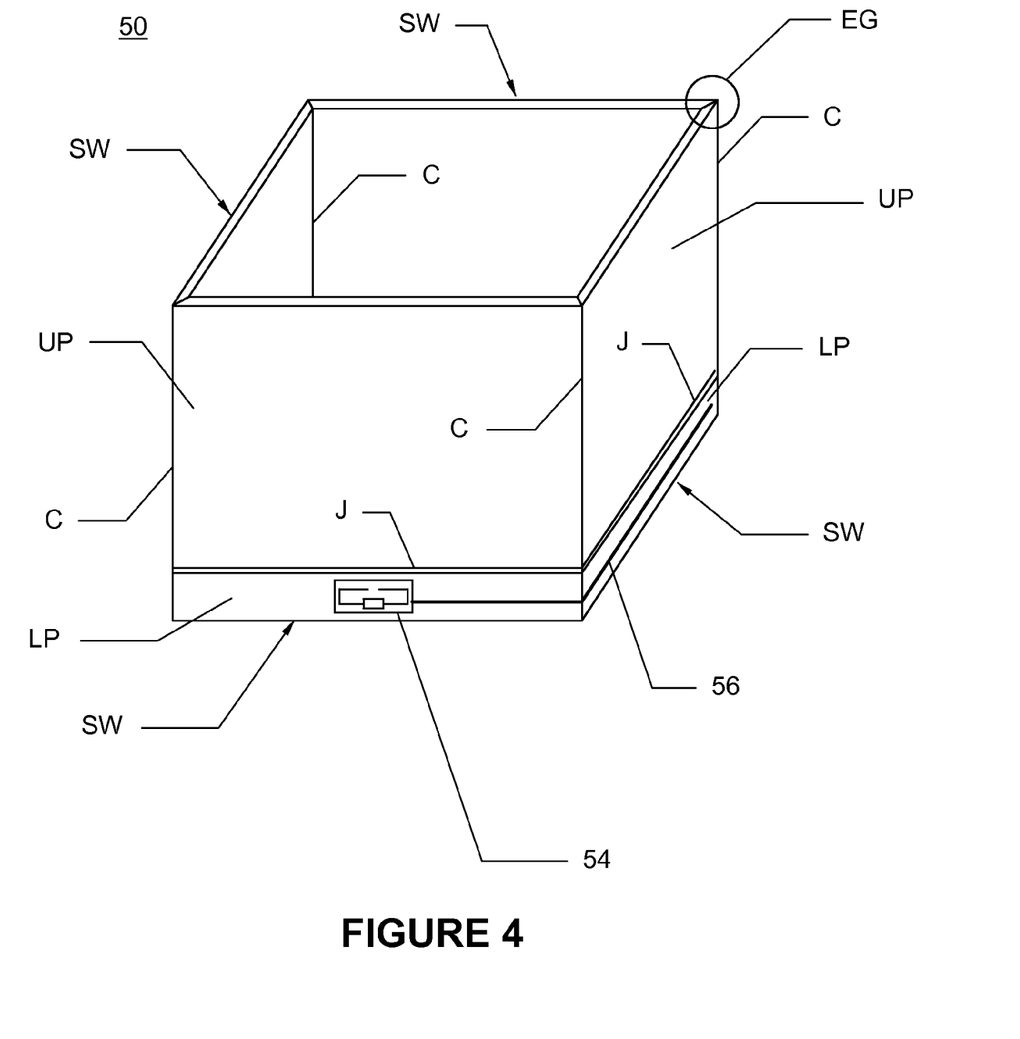
FIG. 4 is a diagrammatic illustration showing a perspective view of an exemplary collapsible RFID enabled crate in accordance with aspects of the present inventive subject matter.

With reference now to FIG. 4, in one suitable embodiment, the crate 50 is optionally collapsible. For example, to achieve this feature, as shown in FIG. 4 each side wall SW is articulated and includes an upper portion UP pivotally connected to a lower portion LP via a joint J. Suitably, at least the upper portions UP of the side walls SW of the crate 50 are capable of being selectively joined to one another where they meet at the respective corners C of the crate 50, and the lower portions LP of each side wall SW are connected or joined to the bottom side or base of the crate 50. Optionally, the upper portions UP of the side walls SW can remain joined at the corners C of the crate 50 via suitably mated slots and tabs or other like mechanically engageable members EG formed on the abutting or adjacent ends of the upper portions UP of the side walls SW. To collapse the crate 50, the adjacent ends of the upper portions UPs of the side walls SW which otherwise meet at the respective corners C of the crate 50 are first disengaged from one another.

Suitably, the joint J in each side wall SW is located at or near the bottom side or base of the crate 50, and the lower portion LP of each side wall SW is joined or otherwise connected to the aforementioned bottom or base. For example, the joint J is optionally implemented via a suitable hinge or a fold line or other like joint. Accordingly, when the upper portions UP of the side walls SW are disengaged from one another, they are free to be folded flat and/or otherwise pivoted about their respective joints J so as to lay significantly parallel with the base B.

As seen in FIG. 4, the inlay 54 and the antenna 56 are arranged and/or located below the joints J, i.e., in or on the lower portions LP of the side walls SW. Accordingly, the crate 50 can be selectively collapsed with out concern over damaging, harming, disrupting or otherwise disturbing the inlay 54 or the secondary antenna 56.

Figure 5:
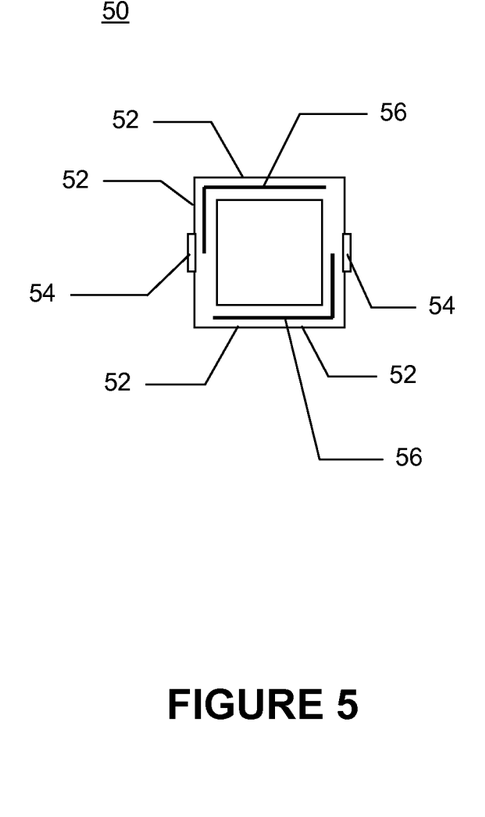
FIG. 5 is a diagrammatic illustration showing a top view of an exemplary RFID enabled crate in accordance with aspects of the present inventive subject matter, including multiple RFID inlays and a corresponding multitude of secondary and/or external antennas.

In yet another suitable embodiment, as seen in FIG. 5, the crate 50 may optionally be tagged with a plurality of RFID inlays 54 and equipped with a corresponding plurality of external or secondary antennas 56. In this case, each inlay 54 is located on a distinct first side 52 of the crate 50 and the associated secondary antenna is arranged to extend at least partially across a second side 52 of the crate 50 which is different from the first side 52 where the corresponding RFID inlay 54 is located. In the illustrated example, the RFID inlays 54 are located on opposite sides 52 of the crate 50 and each secondary or external antenna 56 wraps around the crate 50 and extends at least partially across opposing second sides 52. In another embodiment there may be four inlays, one on each side wall of the crate and four separate secondary antennas.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A radio frequency identification (RFID) enabled crate comprising:
    a plurality of side walls;
    an RFID inlay supported on a first one of the plurality of side walls, the RFID inlay having a chip connected to an antenna;
    a secondary antenna, distinct from the antenna of the RFID inlay, capacitively or inductively coupled to the RFID inlay, said secondary antenna extending at least partially across at least a second one of the plurality of sides, said second one of the sides being different from the first one where the RFID inlay is located; and
    wherein the crate is collapsible having a base portion surrounded by the plurality of side walls, each side wall includes an upper portion pivotally connected to a lower portion via a joint such that the upper portions of each side wall remain joined at corners of the crate via engageable members and the crate collapses by disengaging the upper portions that meet at the corners of the crate such that the inlay and the secondary antenna are located below joints on the lower portions of the side walls.

2. The crate of claim 1, wherein the RFID inlay is a passive ultra-high frequency device.

3. The crate of claim 1, wherein the inlay is passive.

4. The crate of claim 1, wherein the inlay is active.

5. A RFID enable crate, comprising:
    A-collapsible crate having a base portion surrounded by a series of side walls, at least one of the sidewalls having a conductive element contained within the at least one side wall, the conductive element serving as a secondary antenna, each side wall includes an upper portion pivotally connected to a lower portion via a joint such that the upper portions of each side wall remain joined at corners of the crate via engageable members and the crate collapses by disengaging the upper portions that meet at the corners of the crate such that the inlay and the secondary antenna are located below the joint on the lower portions of the side walls;
    a plurality of consumer goods disposed on the base portion of the crate; and
    a RFID inlay having a chip connected to an antenna adhesively attached to the at least one side wall and disposed on the at least one side wall so as to capacitively couple to the conductive element.

6. A RFID enabled crate as recited in claim 5, wherein the plurality of consumer goods are bottles of water.

7. A RFID enabled crate as recited in claim 5, wherein the plurality of consumer goods are canned goods.

8. A RFID enabled crate as recited in claim 5, wherein the RFID inlay is a UHF RFID device.

9. The crate of claim 5, wherein the conductive element is a secondary antenna.

10. The crate of claim 9, wherein the RFID inlay includes a primary antenna.

11. The crate of claim 5, wherein the crate is collapsible.

12. The crate of claim 5, wherein the crate is plastic.

13. A RFID enabled crate, comprising:
    A collapsible crate having a base portion surrounded by a series of side walls, with more than two of the sidewalls having a conductive element which functions as an antenna contained within the sidewalls wherein each side wall includes an upper portion pivotally connected to a lower portion via a joint such that the upper portions of each side wall remain joined at corners of the crate via engageable members and the crate collapses by disengaging the upper portions that meet at the corners of the crate such that the inlay and the secondary antenna are located below the joint on the lower portions of the side walls;
    a plurality of consumer goods disposed on the base portion of the crate;
    at least one RFID inlay, the RFID inlay having a chip connected to an antenna distinct from the conductive element, the at least one RFID inlay adhesively attached to the at least one side wall having a conductive element and disposed on the at least one side wall so that the RFID inlay will capacitively couple to the conductive element.

14. A RFID enabled crate as recited in claim 13, wherein a second RFID inlay is applied to another of the side walls having the conductive element, different from the at least one side wall.

15. A RFID enabled crate as recited in claim 13, wherein each of the side walls has a conductive element contained therein and each of the side walls has a RFID inlay applied thereto and each of the RFID inlays is capacitively coupled to respective conductive elements contained within the sidewalls.

16. The crate of claim 13, wherein the conductive element is a secondary element.

* * * * *